(12) United States Patent
Valley et al.

(10) Patent No.: US 9,164,206 B2
(45) Date of Patent: Oct. 20, 2015

(54) VARIABLE FOCAL LENGTH ACHROMATIC LENS SYSTEM COMPRISING A DIFFRACTIVE LENS AND A REFRACTIVE LENS

(71) Applicant: The Arizona Board of Regents on Behalf of the University of Arizona, Tucson, AZ (US)

(72) Inventors: Pouria Valley, Scottsdale, AZ (US); Nickolaos Savidis, Tucson, AZ (US); James T. Schwiegerling, Tucson, AZ (US); Gholam Peyman, Sun City, AZ (US); Nasser N. Peyghambarian, Tuscon, AZ (US)

(73) Assignee: The Arizona Board of Regents of Behalf of the University of Arizona, Tucson, AZ (US)

( * ) Notice: Subject to any disclaimer, the term of this patent is extended or adjusted under 35 U.S.C. 154(b) by 235 days.

(21) Appl. No.: 13/857,032

(22) Filed: Apr. 4, 2013

(65) Prior Publication Data
US 2013/0286309 A1    Oct. 31, 2013

Related U.S. Application Data

(60) Provisional application No. 61/686,385, filed on Apr. 4, 2012.

(51) Int. Cl.
*G02F 1/13*    (2006.01)
*G02B 5/18*    (2006.01)
(Continued)

(52) U.S. Cl.
CPC ............ *G02B 5/1876* (2013.01); *G02B 3/14* (2013.01); *G02F 1/137* (2013.01); *G02F 1/29* (2013.01); *G02C 7/083* (2013.01); *G02F 2001/294* (2013.01)

(58) Field of Classification Search
CPC ........ G02B 5/1876; G02B 3/14; G02F 1/137; G02F 1/29
USPC ................................................... 349/200–201
See application file for complete search history.

(56) References Cited

U.S. PATENT DOCUMENTS

| | | | | |
|---|---|---|---|---|
| 5,581,405 | A | * | 12/1996 | Meyers et al. ................. 359/571 |
| 2009/0303600 | A1 | * | 12/2009 | Matsumoto et al. .......... 359/576 |
| 2010/0074077 | A1 | * | 3/2010 | Katayama .................. 369/53.12 |

OTHER PUBLICATIONS

P. Valley, D. L. Mathine, M. R. Dodge, J. Schwiegerling, G. Peyman, and N, Peyghambarian, "Tunable-focus flat liquid-crystal diffractive lens," Opt. Lett. 35,336-338 (2010).
(Continued)

*Primary Examiner* — Paul Lee
(74) *Attorney, Agent, or Firm* — Davis Wright Tremaine LLP

(57) ABSTRACT

A variable focal length achromatic lens includes a flat liquid crystal diffractive lens and a pressure-controlled fluidic refractive lens. The diffractive lens is composed of a flat binary Fresnel zone structure and a thin liquid crystal layer, producing high efficiency and millisecond switching times while applying a low ac voltage input. The focusing power of the diffractive lens is adjusted by electrically modifying the sub-zones and re-establishing phase wrapping points. The refractive lens includes a fluid chamber with a flat glass surface and an opposing elastic polydimethylsiloxane (PDMS) membrane surface. Inserting fluid volume through a pump system into the clear aperture region alters the membrane curvature and adjusts the refractive lens' focal position. Primary chromatic aberration is remarkably reduced through the coupling of the fluidic and diffractive lenses at a number of selected focal lengths. Potential applications include miniature color imaging systems, medical and ophthalmic devices, or any design that utilizes variable focal length achromats.

11 Claims, 4 Drawing Sheets

(51) Int. Cl.
 G02F 1/137 (2006.01)
 G02F 1/29 (2006.01)
 G02B 3/14 (2006.01)
 G02C 7/08 (2006.01)

(56) References Cited

OTHER PUBLICATIONS

P. Valley, M. R. Dodge, J. Schwiegerling, G. Peyman, and N. Peyghambarian, "Nonmechanical bifocal zoom telescope," Opt. Lett. 35, 2582-2584 (2010).

S. Sato, A. Sugiyama, and R. Sato, "Variable-Focus Liquid-Crystal Fresnel Lens," Jpn. J. Appl. Phys. 24 pp. L626-L628 (1985).

H. Ren, Y.H. Fan, and S.T. Wu, "Tunable Fresnel lens using nanoscale polymer-dispersed liquid crystals," Appl. Phys. Lett. 83, 1515-1517 (2003).

B.E. Bagwell, D.V. Wick, R. Batchko, J.D. Mansell, T. Martiez, S. Serati, G. Sharp, and J. Schwiegerling, "Liquid crystal based active optics," Proc. SPIE 6289, 628908 (2006).

H.C. Lin and Y.H. Lin, "An electrically tunable focusing liquid crystal lens with a built-in planar polymeric lens," Appl. Phys. Lett. 98, 083503 (2011).

O. Pishnyak, S. Sato, and O. D. Lavrentovich, "Electrically tunable lens based on a dual-frequency nematic liquid crystal," Appl. Opt. 45, 4576-4582 (2006).

H. Ren, Y.H. Fan, S. Gauza, and S.T. Wu, "Tunable-focus flat liquid crystal spherical lens," Appl. Phys. Lett. 84, 4789-4791 (2004).

D.Y. Zhang, N. Justis, and Y.H. Lo, "Integrated fluidic adaptive zoom lens," Opt. Lett. 29, 2855-2857 (2004).

H. Ren, D. Fox, P. A. Anderson, B. Wu, and S.T. Wu, "Tunable-focus liquid lens controlled using a servo motor," Opt. Express 14, 8031-8036 (2006).

R, Marks, D. L. Mathine, G. Peyman, J. Schwiegerling, and N. Peyghambarian, "Adjustable fluidic lenses for ophthalmic corrections," Opt. Lett. 34, 515-517. (2009).

T. Stone and N. George, "Hybrid diffractive-refractive lenses and achromats," Appl. Opt. 27, 2960-2971 (1988).

G. Zhou, H. M. Leung, H. Yu, A. S. Kumar, and F. S. Chau, "Liquid tunable diffractive/refractive hybrid lens," Opt. Lett. 34, 2793-2795 (2009).

M. Daimon and A. Masumura, "Measurement of the refractive index of distilled water from the near-infrared region to the ultraviolet region," Appl. Opt. 46, 3811-3820 (2007).

B. Apter, U. Efron, and E. Bahat-Treidel "On the fringing field effects in liquid-crystal beam-steering devices," Appl. Opt. 43, 11-19 (2004).

Valley et al., "Adjustable Hybrid Diffractive/Refractive Achromatic Lens," Optics Express, Apr. 11, 2011, vol. 19, No. 8, pp. 7468-7479.

* cited by examiner

VARIABLE FOCAL LENGTH ACHROMATIC LENS SYSTEM COMPRISING A DIFFRACTIVE LENS AND A REFRACTIVE LENS

CROSS-REFERENCE TO RELATED APPLICATION

This application claims priority to and receives the benefit of U.S. Provisional Patent Application No. 61/686,385 filed Apr. 4, 2012, which application is incorporated herein in its entirety by this reference.

GOVERNMENT RIGHTS

This invention was made with government support from the National Science Foundation through CIAN ERC, under grant #EEC-0812072NIH. The government has certain rights in the invention.

BACKGROUND OF THE INVENTION

A traditional achromatic lens or achromat corrects for primary chromatic aberration by matching the focal points of a red and a blue wavelength. The dispersion is reduced over the visible spectrum, however residual secondary chromatic aberration remains at the green wavelength. Achromatic doublets consist of a crown glass followed by a flint. The crown glass has a positive focal length with low dispersion while the flint has a negative power with high dispersion. The combination of these two glass disparities is designed to match the red and blue wavelengths to a common focus along the optical axis (z-axis) to eliminate primary chromatic aberration.

It is known that diffractive lenses have strong chromatic aberration. See, Donald C. O'Shea, Thomas J. Suleski, Alan D. Kathman, Dennis W. Prather, *Diffractive Optics: Design, Fabrication, and Test* (SPIE Press Book, 2004). We have previously reported on designing and demonstrating adjustable focus diffractive lenses using liquid crystal as the variable index medium. See, P. Valley, D. L. Mathine, M. R. Dodge, J. Schwiegerling, G. Peyman, and N, Peyghambarian, "Tunable-focus flat liquid-crystal diffractive lens," Opt. Lett. 35, 336-338 (2010); P. Valley, M. R. Dodge, J. Schwiegerling, G. Peyman, and N. Peyghambarian, "Nonmechanical bifocal zoom telescope," Opt. Lett. 35, 2582-2584 (2010).

Previously, discrete tunable liquid crystal diffractive lenses have been proposed. See, P. Valley, D. L. Mathine, M. R. Dodge, J. Schwiegerling, G. Peyman, and N. Peyghambarian, "Tunable-focus flat liquid-crystal diffractive lens," Opt. Lett. 35, 336-338 (2010); P. Valley, M. R. Dodge, J. Schwiegerling, G. Peyman, and N. Peyghambarian, "Nonmechanical bifocal zoom telescope," Opt. Lett. 35, 2582-2584 (2010); S. Sato, A. Sugiyama, and R. Sato, "Variable-Focus Liquid-Crystal Fresnel Lens," Jpn. J. Appl. Phys. 24 pp. L626-628 (1985); H. Ren, Y. H. Fan, and S. T. Wu, "Tunable Fresnel lens using nanoscale polymer-dispersed liquid crystals," Appl. Phys. Lett. 83, 1515-1517 (2003); B. E. Bagwell, D. V. Wick, R. Batchko, J. D. Mansell, T. Martiez, S. Serati, G. Sharp, and J. Schwiegerling, "Liquid crystal based active optics," Proc. SPIE 6289, 628908 (2006)). Continuous tunable liquid crystal refractive lenses are also known. See, H. C. Lin and Y. H. Lin, "An electrically tunable focusing liquid crystal lens with a built-in planar polymeric lens," Appl. Phys. Lett. 98, 083503 (2011); O. Pishnyak, S. Sato, and O. D. Lavrentovich, "Electrically tunable lens based on a dual-frequency nematic liquid crystal," Appl. Opt. 45, 4576-4582 (2006); H. Ren, Y. H. Fan, S. Gauza, and S. T. Wu, "Tunable-focus flat liquid crystal spherical lens," Appl. Phys. Lett. 84, 789-4791 (2004). Articles have been published on continuously tunable fluidic lenses. See, D. Y. Zhang, N. Justis, and Y. H. Lo, "Integrated fluidic adaptive zoom lens," Opt. Lett. 29, 2855-2857 (2004); H. Ren, D. Fox, P. A. Anderson, B. Wu, and S. T. Wu, "Tunable-focus liquid lens controlled using a servo motor," Opt. Express 14, 8031-8036 (2006); R, Marks, D. L. Mathine, G. Peyman, J. Schwiegerling, and N. Peyghambarian, "Adjustable fluidic lenses for ophthalmic corrections," Opt. Lett. 34, 515-517 (2009)) with variable focal lengths were demonstrated individually.

At each focal location chromatic aberration is observable when uncorrected. Chromatic aberration is greater in elements with larger dispersion, such as diffractive lenses, and becomes more significant for materials with lower Abbe numbers. Diffractive and holographic lenses have been proposed to replace the traditional achromatic doublets for fixed focal length designs. See, Donald C. O'Shea, Thomas J. Suleski, Alan D. Kathman, Dennis W. Prather, *Diffractive Optics: Design, Fabrication, and Test* (SPIE Press Book, 2004); T. Stone and N. George, "Hybrid diffractive-refractive lenses and achromats," Appl. Opt. 27, 2960-2971 (1988)). More recently, a useful hybrid variable focal length fluidic/diffractive lens was demonstrated; however, the diffractive component applies a fixed focal length. See, G. Zhou, H. M. Leung, H. Yu, A. S. Kumar, and F. S. Chau, "Liquid tunable diffractive/refractive hybrid lens," Opt. Lett. 34, 2793-2795 (2009).

It is desirable to provide an improved lens combination with more versatile characteristics.

SUMMARY OF THE INVENTION

One embodiment of the invention includes an optical system comprising two lenses wherein a focal length of each of the two lenses is adjustable to alter a focal length of the system, so that the system is substantially achromatic over a range of values of focal length of the system; and at least one device for adjusting the focal length of each of the two lenses.

Another embodiment of the invention is directed to a method for making an optical system comprising providing a diffractive lens which comprises a Fresnel zone plate having portions that form a pattern, a liquid crystal material and an electrode adjacent to the liquid crystal material. Voltages are applied to the electrode and the portions of the Fresnel zone plate to select a focal length of the diffractive lens. A fluid with an Abbe number is selected and an amount of the fluid in a fluidic lens is adjusted to select a radius of curvature of the fluidic lens. When the fluidic lens is placed adjacent to the diffractive lens, the fluidic lens compensates for the primary chromatic aberration of the diffractive lens over a range of focal lengths of the optical system in excess of 10 mm.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

For simplicity in description, identical components are labelled by the same numerals in this Application.

DETAILED DESCRIPTION

Figure 1:
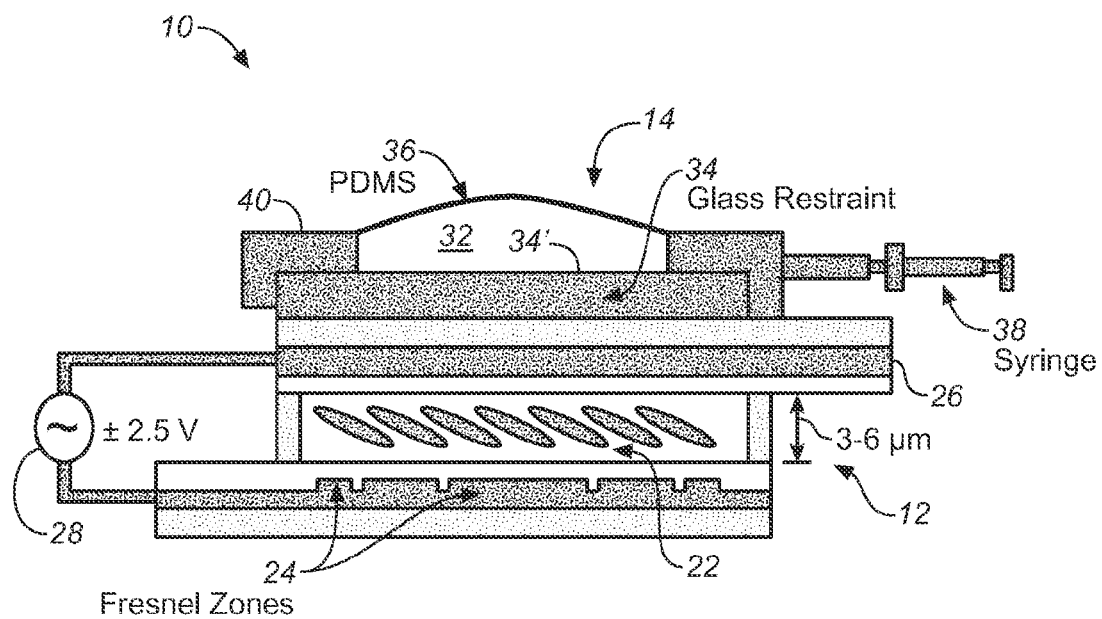
FIG. 1 is a schematic view of a hybrid liquid crystal diffractive lens and fluidic lens to illustrate one embodiment of the invention.

We present herein an adjustable liquid crystal diffractive lens and an adjustable pressure-controlled fluidic lens that in combination (FIG. 1) minimizes primary chromatic aberration. In effect, we have created a variable achromatic doublet with no moving parts. As shown in FIG. 1, the doublet 10 includes a diffractive lens 12 and fluidic lens 14. Diffractive lens 12 includes nematic liquid crystal 22 sandwiched between a flat Fresnel zone electrode substrate or plate 24 and a ground reference substrate 26, where both substrates contain a transparent and conductive Indium-Tin-Oxide (ITO) layer. Each zone of Fresnel zone plate or electrode 24 is divided into subzones or portions that from a pattern shown more clearly in FIG. 2. By using voltage supply 28 to apply voltages (e.g. ±2.5V) to electrodes 24 and 26, and appropriately shunting the subzones or portions in zone plate or electrode 24 as described below, it is possible to select certain focal lengths of the diffractive lens 12. Fluidic lens 14 includes a fluid chamber 32 with a flat glass surface 34' of glass restraint 34 and an opposing elastic polydimethylsiloxane (PDMS) membrane 36. Inserting or withdrawing fluid volume through a pump system (not shown) through syringe 38 into the clear aperture region alters the membrane curvature and adjusts the refractive lens' focal position.

Diffractive lenses have an Abbe number much smaller than their refractive counterparts. See, Donald C. O'Shea, Thomas J. Suleski, Alan D. Kathman, Dennis W. Prather, *Diffractive Optics: Design, Fabrication, and Test* (SPIE Press Book, 2004), The Abbe number of a diffractive lens is unique in that it is equal to −3.45, solely dependent upon the specified Fraunhofer a F, C wavelengths, as given by $V_{diffractive}=\lambda_d/(\lambda_f-\lambda_c)$. See, Donald C. O'Shea, Thomas J. Suleski, Alan D. Kathman, Dennis W. Prather, *Diffractive Optics: Design, Fabrication, and Test* (SPIE Press Book, 2004); T. Stone and N. George, "Hybrid diffractive-refractive lenses and achromats," Appl. Opt. 27, 2960-2971 (1988)). The focal length of a Fresnel zone-based diffractive lens is given by $f=r_1^2/(2\lambda)$ where $r_1$ is the radius of the first Fresnel zone and $\lambda$ is the wavelength of the incident light. See, Donald C. O'Shea, Thomas J. Suleski, Alan D. Kathman, Dennis W. Prather, *Diffractive Optics: Design, Fabrication, and Test* (SPIE Press Book, 2004). Therefore, the focal length at any other wavelength $\lambda$, in nm, can be scaled by the design wavelength according to $f(\lambda)=(555/\lambda)f_d$ where $f_d$ is the design focal length at 555 nm.

An approach is established to correlate the diffractive lens with the refractive lens. For certain focal lengths of the diffractive lens, $f_d$, we may choose the focal lengths and Abbe number of the fluidic lens such that they satisfy the achromat equation: $V_f f_f - 3.45 f_d = 0$, where $f_f$ and $V_f$ are the focal length and Abbe number of the fluidic lens, respectively. Refractive lenses have an Abbe number that is related to the indices of refraction as specified by the Fraunhofer d, C, F lines where $V_{fluidic}=(n_d-1)/(n_f-n_c)$. By knowing the focal length of the diffractive lens and the Abbe numbers of the refractive and diffractive lenses, one is able to determine the focal length range of the fluidic lens required to achieve an achromat. Table 1 below identifies which focal length ranges are necessary for a variable fluidic lens to produce an achromat with diffractive lenses ranging between 67 mm and 1000 mm focal lengths at specified Abbe numbers of the refractive lens. Optical glasses have an Abbe range between 25 and 65. See, John E. Greivenkamp "Field guide to geometrical optics," SPIE Press (2004), however using optical fluids increases this range of achievable Abbe numbers. Once the focal lengths are determined to identify what is necessary to match the diffractive lenses, the proper Abbe number and hence fluid may be chosen to achieve this goal.

1. Liquid Crystal Diffractive Lenses

We began by designing diffractive elements with known focal lengths and Abbe numbers. We developed two variable focal length diffractive lenses. Diffractive lens A possesses a design focal length of 1000 mm at $\lambda=555$ nm with a clear aperture of 10 mm and eight binary phase quantization that results in a maximum diffraction efficiency of 94.9% in theory. Diffractive lens B possesses a design focal length of 400 mm at X=555 nm with a clear aperture of 6 mm and twelve levels of binary phase quantization that results in a maximum diffraction efficiency of 97.7% in theory. By properly shunting the electrodes, the diffractive lens A can provide focal lengths of 1000 mm, 500 mm, and 250 mm, and the diffractive lens B can provide 400 mm, 200 mm, 133 mm, 100 mm, and 67 mm focal lengths. See P. Valley, D. L. Mathine, M. R. Dodge, J. Schwiegerling, G. Peyman, and N, Peyghambarian, "Tunable-focus flat liquid-crystal diffractive lens," Opt. Lett. 35, 336-338 (2010). The shunting scheme described in this article is illustrated in FIG. 2 and explained in more detail immediately below.

Figure 2:
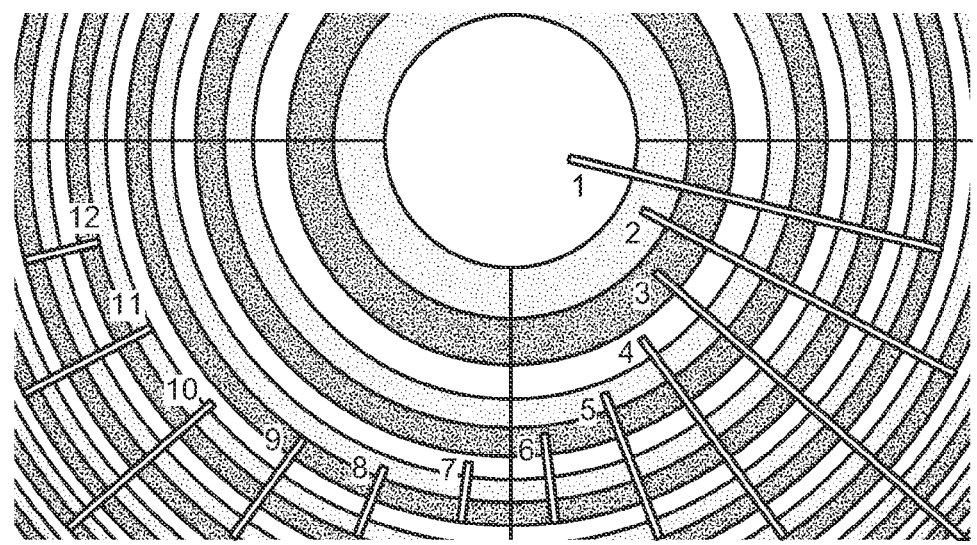
FIG. 2 is a schematic top view of a liquid crystal diffractive lens to illustrate the embodiment of FIG. 1.

One type of diffractive lens structure is the binary Fresnel zone plate 24 as shown in FIGS. 1 and 2. As shown in FIG. 2, each zone is divided into 12 subzones. Twelve electrical buses may be established to shunt together all of the corresponding subzones in all of the zones. Shunting of electrodes is done in a way that the correct retardation step sequence is achieved as moving outward radially. For example, going from 12 electrodes per zone to three electrodes per zone happens by electrically shunting the following subzones of all zones together so that the shunted electrodes will all have the same voltages: (1, 4, 7, 10), (2, 5, 8, 11), and (3, 6, 9, 12) as shown in FIG. 2 by white, gray, and black regions. This way, the number of $2\pi$ zone boundaries is increased by a factor of four, so a location that was labeled the zone boundary m now becomes the zone boundary 4 m. For example, the first zone boundary as marked by 12th subzone in FIG. 2 now becomes the fourth zone boundary. So the focal length is switched from f to ¼ of f based on the digitized Fresnel zone equation: $f=r\_m^2/2m\lambda$, where rm is the radius of the mth zone, $\lambda$ is the wavelength, and m is an index denoting the mth zone boundary. Thus, by properly shunting every 2, 3, 4, and 6 electrodes together we get ⅙, ¼, ⅓, and ½ of f, respectively, in addition to the original design focal length f.

Desired phase profiles are achieved by shifting the effective refractive index of a nematic liquid crystal 22. The nematic liquid crystal 22 is sandwiched between a flat Fresnel zone electrode substrate 24 and a ground reference substrate 26, where both substrates contain a transparent and conductive Indium-Tin-Oxide (ITO) layer. To maintain the electrical isolation between the electrodes in the diffractive lens A, the odd-numbered and even-numbered electrodes are formed in two separate layers with an insulating layer of $SiO_2$ in between. See, P. Valley, M. R. Dodge, J. Schwiegerling, G. Peyman, and N. Peyghambarian, "Nonmechanical bifocal zoom telescope," Opt. Lett. 35, 2582-2584 (2010). For the diffractive lens B, one-micron gaps are implemented as isolators between the electrodes that reduce the fabrication steps. See, P. Valley, D. L. Mathine, M. R. Dodge, J. Schwiegerling, G. Peyman, and N. Peyghambarian, "Tunable-focus flat liquid-crystal diffractive lens," Opt. Lett. 35, 336-338 (2010). The electrodes (or subzones) of the same counting index within each of the Fresnel zones are connected to bus bars through vias made in the insulating layer of $SiO_2$.

Fabrication of our diffractive lenses involves a few steps of deposition, lithography and etching. Ion beam sputtering was the deposition method used to produce uniform films of around 150 nm thick. Then photo-lithography was carried out using a diluted S-1805 photoresist (from Rohm and Hoss) and Karl-Suss MA6 mask aligner. The patterns were then etched using the appropriate acids/etchants for each layer. After the micro-fabrication process, both the patterned electrodes and the reference substrates are spin-coated with a nylon alignment layer. The substrates are then baked at 115° C., buffed unidirectionally, and put together in the anti-parallel geometry to provide a homogeneous molecular orientation for the liquid crystal. Glass fiber spacers are used in the cell assembly. The lens cell is filled with the liquid crystal (E7 from Merck) via the capillary action at a temperature above the clearing point (60° C.) and cooled slowly to the room temperature. Finally, the cell is sealed and connected to drive electronics through a set of thin stranded wires.

Two resistive circuits with eight and twelve potentiometers drive the diffractive lenses. The resistances and the input voltage, hence the driving electric field across different Fresnel subzones, are adjusted to introduce the appropriate phase shift for the maximum diffraction efficiency. The voltages are applied simultaneously and are monotonically increasing from the first to the last subzone. The focal lengths are electronically switchable to fractions of the maximum design focal length in milliseconds. It is also possible to achieve negative focal lengths by reversing the order in which the voltages are applied to the diffractive lenses, thus reversing the slope of the phase profile. See, P. Valley, D. L. Mathine, M. R. Dodge, J. Schwiegerling, G. Peyman, and N, Peyghambarian, "Tunable-focus flat liquid-crystal diffractive lens," Opt. Lett. 35, 336-338 (2010); P. Valley, M. R. Dodge, J. Schwiegerling, G. Peyman, and N. Peyghambarian, "Nonmechanical bifocal zoom telescope," Opt. Lett. 35, 2582-2584 (2010).

1. Fluidic Refractive Lens

The refractive lens 14 is a pilano-convex singlet with a predetermined amount of fluid inserted into the lens chamber. During preparation, fluid is inserted in excess within the chamber as to induce a vacuum pressure to evacuate air. If the air is not evacuated then it is treated as a second index within the clear aperture, resulting in a drastic alteration of desired lens properties. Only the membrane curvature changes when fluid is pumped into the chamber since the frame is metal and the opposing side is transparent glass.

The deformable membrane layer is a moldable optically clear elastomer with uniform thickness. Fabrication of the deformable membrane involves a pre-backing process while the PDMS mixture is formulated within molds designed on a flat 5λ glass surface. The mixture is deposited within the molds which are then stirred within a vacuum system as to remove the excess air within the PDMS. The thickness of the membrane depends on the amount f material deposited within each mold. After the air is evacuated, the PDMS is placed into an oven at ~90° C. for an hour. We then remove the PDMS and peel off the membrane layers, which have a designed thickness of approximately 30-120 microns. See R, Marks, D. L. Mathine, G. Peyman, J. Schwiegerling, and N. Peyghambarian, "Adjustable fluidic lenses for ophthalmic corrections," Opt. Lett. 34, 515-517 (2009). The membrane layers are removed with nylon tweezers and trimmed to remove excess material. Removal of excess material is necessary as to ensure a flat membrane to be clamped into the chamber.

The chamber 32 is a metal frame 40 which the membrane locks into, possessing a clear aperture within the center and flanges on its periphery. Control of the lens' output shape is achieved by controlling the clear aperture's opto-mechanical shape, where this clear aperture has a circular shape as to produce a rotationally symmetric fluidic lens. There is a retainer ring (not shown separately from frame 40) that has equal and opposite flanges relative to the metal frame. Through pressure, the membrane is applied onto the flat metal frame and the retainer ring locks the membrane onto the frame. This flat frame is then aligned and squeezed into a two part assembly, creating the singlet chamber 32. The chamber is then mounted onto a frame that has openings to place onto a rail. The chamber possesses a single fluidic fitting that connects the fluid chamber to a syringe 38.

A syringe 38 is placed into a pump system (not shown) that alters the fluid output, permitting for control of the fluidic lens' radius of curvature and focal length. The applied pump controllers (not shown) operate at a maximum of 0.0125 ml/sec, an operation rate of 50 μl in 4 seconds. This corresponds to a focal shift of approximately 10 mm per 50 μl evacuation when there is high lens curvature, and a shift of approximately 50 to 100 mm per 50 μl evacuation. The boundary between high curvature and low curvature varies with the designed focal length. With our fluidic chamber, which was designed for an 80 mm base focal length with methanol, an evacuation of 150 μl defines our barrier between low curvature and high curvature. It is observed in FIG. 3 as the approximate location in which the slope varies in the relative amount of fluid evacuated. Due to drastic fluid removal effects at flatter curvatures, it was opted to decrease the amount of fluid inserted or removed at higher radii of curvature. A piano-convex lens is developed over this region and only positive focal lengths are selectively outputted.

1. Methods and Test Results

It is non-trivial to place the proper fluid into the chamber when compensating for the diffractive lens, Identifying the proper fluid came from a four step process. Firstly, one identifies the membrane's radius of curvature range. This allows for one to physically characterize the limitations of the fluidic lens. Also, by identifying the radius of curvature with a known fluid, it is possible to quantify the focal length range of any fluid by knowing the new fluid's index of refraction. Once one knows the achievable radii of curvature and focal lengths of the fluidic lens, it is necessary to specify the focal lengths needed to compensate for the diffractive lens. For our experimental setup, we have already specified the Abbe number of the diffractive lenses and also the focal lengths achievable by our diffractive lenses. Table 1 took these values into consideration and found the focal length solutions of fluids at a wide scope of Abbe values. Therefore, we match the physical focal length range of the fluidic lens to a reasonable Abbe number so that a high percentage of achromatic doublets are achievable. The final step is to identify a fluid with the proper index of refraction and Abbe number as was previously assessed. It is also important that the fluid found is non-reactive or absorptive with the membrane that one is applying. Through this approach we satisfy the achromat equation: $f_1V_1 + f_2V_2 = 0$, where V is the Abbe number.

TABLE 1

Values needed for fluidic lens focal lengths fg (in mm) at different fluid Abbe number values and given diffractive lens focal lengths at the design wavelength of 555 nm.

| Diffractive lens powers and focal lengths | Needed fg if Vf = 5 | Needed fg if Vf = 10 | Needed fg if Vf = fl3.66 | Needed fg if Vf = 15 | Needed fg if Vf = 20 |
|---|---|---|---|---|---|
| 1 D (1000 mm) | 690.00 | 345.00 | 252.56 | 230.00 | 172.50 |
| 2.0 D (500 mm) | 345.00 | 172.50 | 126.28 | 115.00 | 86.25 |
| 2.5 D (400 mm) | 276.00 | 138.00 | 101.02 | 92.00 | 69.00 |
| 4.0 D (250 mm) | 172.50 | 86.25 | 63.14 | 57.50 | 43.13 |
| 5.0 D (200 mm) | 138.00 | 69.00 | 50.51 | 46.00 | 34.50 |
| 7.5 D (133.33 mm) | 92.00 | 46.00 | 33.67 | 30.67 | 23.00 |
| 10 D (100 mm) | 69.00 | 34.50 | 25.26 | 23.00 | 17.25 |
| 15 D (66.66 mm) | 46.00 | 23.00 | 16.84 | 15.33 | 11.50 |
| 20 D (50 mm) | 34.50 | 17.25 | 12.63 | 11.50 | 8.63 |
| 25 D (40 mm) | 27.60 | 13.80 | 10.10 | 9.20 | 6.90 |
| 30 D (33.333 mm) | 23.00 | 11.50 | 8.42 | 7.67 | 5.75 |
| 35 D (28.57 mm) | 19.71 | 9.86 | 7.22 | 6.57 | 4.93 |
| 40 D (25 mm) | 17.25 | 8.63 | 6.31 | 5.75 | 4.31 |
| 50 D (20 mm) | 13.80 | 6.90 | 5.05 | 4.60 | 3.45 |
| 60 D (16.66 mm) | 11.50 | 5.75 | 4.21 | 3.83 | 2.87 |

| | Needed fg if Vf = 25 | Needed fg if Vf = 30 | Needed fg if Vf = 35 | Needed fg if Vf = 40 | Needed fg if Vf = 45 |
|---|---|---|---|---|---|
| 1 D (1000 mm) | 138.00 | 115.00 | 98.57 | 86.25 | 76.67 |
| 2.0 D (500 mm) | 69.00 | 57.50 | 49.29 | 43.13 | 38.33 |
| 2.5 D (400 mm) | 55.20 | 46.00 | 39.43 | 34.50 | 30.67 |
| 4.0 D (250 mm) | 34.50 | 28.75 | 24.64 | 21.56 | 19.17 |
| 5.0 D (200 mm) | 27.60 | 23.00 | 19.71 | 17.25 | 15.33 |
| 7.5 D (133.33 mm) | 18.40 | 15.33 | 13.14 | 11.50 | 10.22 |
| 10 D (100 mm) | 13.80 | 11.50 | 9.86 | 8.63 | 7.67 |
| 15 D (66.66 mm) | 9.20 | 7.67 | 6.57 | 5.75 | 5.11 |
| 20 D (50 mm) | 6.90 | 5.75 | 4.93 | 4.31 | 3.83 |
| 25 D (40 mm) | 5.52 | 4.60 | 3.94 | 3.45 | 3.07 |
| 30 D (33.333 mm) | 4.60 | 3.83 | 3.29 | 2.87 | 2.56 |
| 35 D (28.57 mm) | 3.94 | 3.29 | 2.82 | 2.46 | 2.19 |
| 40 D (25 mm) | 3.45 | 2.88 | 2.46 | 2.16 | 1.92 |
| 50 D (20 mm) | 2.76 | 2.30 | 1.97 | 1.73 | 1.53 |
| 60 D (16.66 mm) | 2.30 | 1.92 | 1.64 | 1.44 | 1.28 |

| | Needed fg if Vf = 50 | Needed fg if Vf = 55 | Needed fg if Vf = 60 | Needed fg if Vf = 65 | Needed fg if Vf = 70 |
|---|---|---|---|---|---|
| 1 D (1000 mm) | 69.00 | 62.73 | 57.50 | 53.08 | 49.29 |
| 2.0 D (500 mm) | 34.50 | 31.36 | 28.75 | 26.54 | 28.75 |
| 2.5 D (400 mm) | 27.60 | 25.09 | 23.00 | 21.23 | 19.71 |
| 4.0 D (250 mm) | 17.25 | 15.68 | 14.38 | 13.27 | 12.32 |
| 5.0 D (200 mm) | 13.80 | 12.55 | 11.50 | 10.62 | 9.86 |
| 7.5 D (133.33 mm) | 9.20 | 8.36 | 7.67 | 7.08 | 6.57 |
| 10 D (100 mm) | 6.90 | 6.27 | 5.75 | 5.31 | 4.93 |
| 15 D (66.66 mm) | 4.60 | 4.18 | 3.83 | 3.54 | 3.29 |
| 20 D (50 mm) | 3.45 | 3.14 | 2.88 | 2.65 | 2.46 |

De-ionized (DI) water was first used to characterize the fluidic lens' radius of curvature range. DI water has an Abbe number of 55.74 and the indices of refraction are known for a wide scope of wavelength ranges (See, M. Daimon and A. Masumura, "Measurement of the refractive index of distilled water from the near-infrared region to the ultraviolet region," Appl. Opt. 46, 3811-3820 (2007)).

Figure 4:
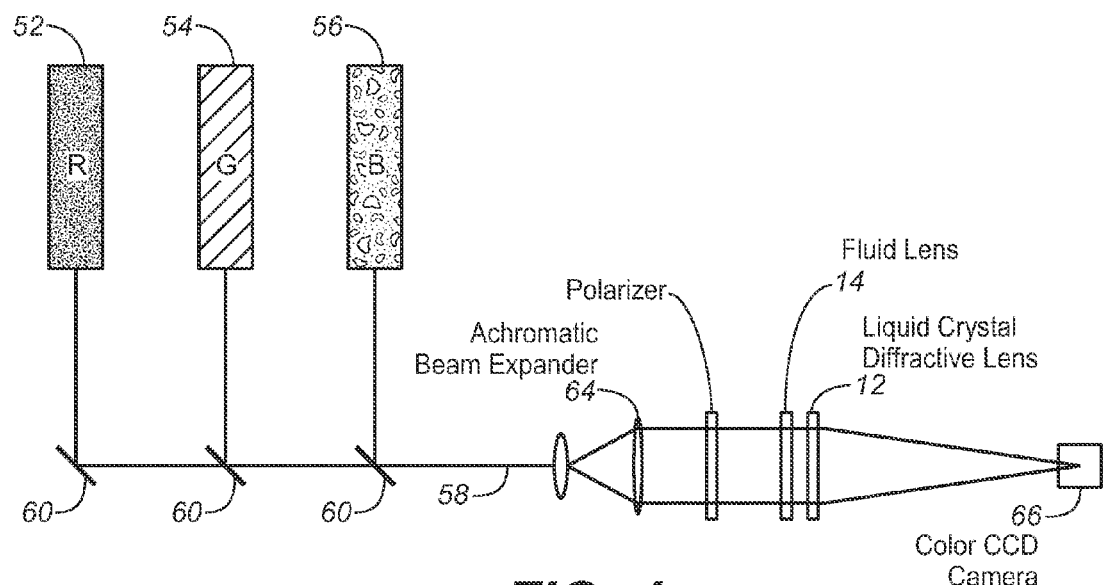
FIG. 4 is a test setup with three laser beams aligned and collimated to measure the diffractive and fluidic lens by a color CCD camera on a rail.

The focal lengths of the DI water fluidic lens were first measured using red (HeNe 633 nm), green (HeNe 543 nm), and blue (Argon 488 nm) lasers 52, 54 and 56 with the previously described pump controls. All three laser beams were aligned to the optical axis 58. The combination of the lasers allows us to either individually test the lenses 12, 14 with specific wavelengths or to concurrently test multiple wavelengths as shown in FIG. 4. The dichroic mirrors 60 have specified bands in which they reflect and transmit. We found the proper dichroic mirrors to pass the previous wavelengths while reflecting the incoming perpendicular laser wavelengths. By mixing the lasers or adding an aperture stop, we varied the desired input wavelengths. We then used a single beam expander 64 using an achromatic objective lens and another achromatic collimating lens to collimate the three beams in this single optical axis. A color CCD camera 66 on a rail was employed to find the best focus spot. The spots were not of a perfect sphere since there was a slight amount of astigmatism observed at the focal spot. This is caused by a slight distribution in tension around the flanges and it is observed more drastically at longer focal lengths.

As was previously stated we applied DI water, with known indices of refraction per wavelength, in identifying the fluidic lenses radius of curvature range. For a given amount of fluid in the lens, we measured the focal length at each of the three test wavelengths. The radius of curvature, r, of the lens surface was calculated using $\Phi = 1/f = (n_{air} - n_{DI})/r$, where $\Phi$ is the surface power and $n_{air}$ and nm are the indices of refraction for air and DI water per index, respectively. It is noted that with the defined coordinate system the radius of curvatures are negative values as the vertex to the center propagates to the left; however, we are stating the values as definitions of magnitude as to alleviate the constraint of a coordinate system. The index of refraction for air is approximately one at all wavelengths and the index of refraction of DI water is known at each wavelength (See, M. Daimon and A. Masumura, "Measurement of the refractive index of distilled water from the near-infrared region to the ultraviolet region," Appl. Opt. 46, 3811-3820 (2007).)

The focal length, f of each measurement was equal to the back focal distance of the fluidic lens using the thin lens approximation. Each radius of curvature was calculated at red, green, and blue wavelengths and averaged to determine a single radius of curvature per fluid volume. The experiment was repeated as we increased the fluid volume in the lens by increments of 50 μL.

To define the workable range for the fluidic lens we quantified the repeatability of outputting the radius of curvature. It was found that the average radius of curvature per fluid volume between the three wavelengths varied in accuracy of 0.02% to 0.88% for a radius of curvature from 20 to 100 mm. For DI water this corresponded to a focal length range of 60 mm to 300 mm. To clarify, a radius of curvature with an accuracy of 0.02% means that our lens accuracy for a radius of curvature at 20 mm was at 20 mm+/−0.004 mm or with an accuracy of 0.88% the radius of curvature outputted at 20 mm+/−0.176 mm. Similarly the radius of curvature range for our larger 100 mm varied from 100 mm+/−0.02 mm to 100 mm+/−0.88 mm respectively. It was found that the smaller radii of curvature actually observed a lower amount of inaccuracy. As we increase the amount of fluid we are reducing the lenses radius of curvature. This suggests that our caustic is not as long and more of the rays are focused in one location. What is occurring is that with a smaller radius of curvature we have almost no effect by the frame which allows for the shape of the membrane to be controlled by the fluid with almost no dependence on the opto-mechanical structure. With this higher control the smaller the radius of curvature the higher control of aberrations is observed.

We broke up the accuracy of the radius of curvature into two additional sections. The radius of curvature between 100 to 200 mm had outputted an accuracy between 1 and 2%, which for DI water is a focal length range of 300 to 600 mm. Focal lengths from 600 to 900 mm produced an accuracy on the radius of curvature between 2 and 5% of the expected focal length. Our goal was to apply a highly accurate fluidic lens to couple with the diffractive lens as to diminish in accuracies related to the control of the fluidic lens. These two additional sections had high accuracy and repeatability but were not the best results since they had larger radius of curvatures. Therefore, we defined the highly accurate radius of curvature range between 20 to 100 mm as the fluidic lenses functional range while attempting to determine the best fluid to work with in producing the final achromatic design.

The two most significant fluid characteristics for this experiment, as was observed from the achromat equation, were the fluids focal length and Abbe number. The focal length is dictated by the radius of curvature of the fluidic lens and the index of refraction of the fluid. In the previous paragraph we experimentally assessed the fluidic lenses controlled radius of curvature range to be between 20 to 100 mm with high accuracy. The fluids index of refraction can vary the focal length, but the range would increase or decrease the focal range slightly. This is observable by evaluating $\Phi=1/f=$ $(n_{air}-n_{FL})/r$ once more, where now $n_{FL}$, is the new fluids index of refraction rather than DI water. We observe that our only alteration to the equation is the applied fluids index of refraction. If we find a fluid with a larger index of refraction than the tested DI water, then focal lengths shorter than 60 mm are achievable. As most indices of refraction for glass range between 1.3 and 2.5, a reasonable approximation is that a majority of optical fluids operate within this index range. It is safe to approximate that the calculated focal length range of DI water of 60 mm to 300 mm can be decreased by at least 10 mm to 50 mm or higher. We are not stating that the focal length cannot be further decreased, but rather we are defining a reasonable index of refraction range as to not constrain the fluids when attempting to find the proper Abbe number to produce a functional diffractive/refractive achromatic lens.

With the focal length range approximated it was necessary to determine the proper fluid Abbe number to achromatize the focal lengths of the diffractive lens. On the left hand side of Table 1 are the diffractive lens values that would be required to be achromatized, Table 1 identifies which focal lengths are needed from the fluidic lens for each Abbe number to achieve achromitization with these designed diffractive lens powers. Our approximation showed that our fluidic lens will achieve focal lengths in the relative area of 50 mm or higher. Our experimental DI water has an Abbe number of 55. It is seen within the table that DI water would only achromatize the 1 D Diffractive lens with our fluidic lens, due to the constraints on the lenses radius of curvature. A fluid with an Abbe number of 15 would achromatize four of the diffractive lens' focal lengths and an Abbe number of 10 would achromatize five focal lengths above 50 mm. Theoretically, a fluid with an Abbe number of 5, as observed from Table 1, would produce approximately all possible achromatic combinations from either diffractive lens developed here, since the greatest Diopter range achieved by the diffractive lenses is 15 D. Thus, finding a fluid with known indices of refraction to achieve a focal length as low as 50 mm and a characterized Abbe numbers from 5 to 15 or from about 5 to about 20 offers the capability of illustrating a variable focal length achromat.

Methanol (Methyl alcohol) was chosen as the fluid for the fluidic lens due to its high dispersion value and non-reactivity with the PDMS membrane. Methanol has an Abbe number of 13.66 which achromatizes 5 of the diffractive lens focal lengths as is observed in Table 1 and is widely available as it is a cleaning agent. The desired focal length range to achromatize all of the diffractive lenses focal locations with the fluidic lens would be from 16.8 to 101.0 mm when coupled with diffractive lens B and from 63.14 to 252.6 mm when coupled with diffractive lens A. As was previously stated, the diffractive lens A provides focal lengths of 1000, 500, and 250 mm, and the diffractive lens B provides 400, 200, 133, 100, and 67 mm focal lengths. As seen from Table 1, all three possible focal lengths of the diffractive lens A, and two out of five focal lengths of the diffractive lens B (400 and 200) can be achromatized. Using Table 1, we identify the focal lengths of the fluidic lens for every focal length of the diffractive lens. Results of the two combined focal lengths develops a predicted achromatic focal length at green wavelength through $\Phi_{expected}=\Phi_{diffractive}+\Phi_{fluidic}$ and $f_{expected}=1/\Phi_{expected}$. The five expected achromatic focal lengths, $f_{expected}$, for green must be achieved through the experimental setup for the achromat to work properly.

Focal lengths of the diffractive and fluidic lenses were first measured separately using the red (HeNe 633 nm), green (HeNe 543 nm), and blue (Argon 488 nm) lasers. We used a linear polarizer with the diffractive lens to account for the polarization effects of the nematic liquid crystal. We can remove the polarizer so the lens works with any randomly polarized light if we add another liquid crystal diffractive lens with an orthogonal buffing direction to the first diffractive lens. As expected, the red light comes into focus first for the diffractive lens since it has negative dispersion. The test results for the two diffractive lenses are shown in Table 2 and 3. The experimental and theoretical values of focal lengths at the aforementioned three test wavelengths are presented in Table 2 (diffractive lens A) and Table 3 (diffractive lens B). The design wavelength for both lenses is $\lambda=555$ nm, and the design focal lengths (1000 mm for lens A and 250 mm for lens B) as well as additional observed focal lengths developed when these lenses were shunted as is presented at the design wavelength. The focal lengths at the three test wavelengths are calculated using the diffractive lens formula discussed in the introduction, $f(\lambda)=(555/\lambda)f_d$ where $f_d$ is the design focal length at 555 nm.

TABLE 2

Diffractive lens A results: measured and calculated focal lengths at the three test wavelengths.

| Wavelength | f(555 nm) = 1000 mm | | f(555 nm) = 500 mm | | f(555 nm) = 250 mm | |
|---|---|---|---|---|---|---|
| (nm) | Data | Theory | Data | Theory | Data | Theory |
| 633 | 870 | 876.8 | 435 | 438.4 | 217 | 219.2 |
| 543 | 1015 | 1022.1 | 505 | 511.1 | 252 | 255.5 |
| 488 | 1125 | 1137.3 | 560 | 568.6 | 281 | 284.3 |

TABLE 3

Diffractive lens B results: measured and calculated focal lengths at the three test wavelengths.

| Wavelength | f(555 nm) = 400 | | f(555 nm) = 200 | | f(555 nra) = 133 | | f(555 nm) = 100 | | f(555 nm) = 67 | |
|---|---|---|---|---|---|---|---|---|---|---|
| (nm) | Data | Theory | Data | Theory | Data | Theory | Data | Theory | Data | Theory |
| 633 | 348 | 350.7 | 174 | 175.3 | 116 | 116.9 | 88 | 87.7 | 59 | 58.4 |
| 543 | 405 | 408.5 | 202 | 204.2 | 135 | 136.1 | 102 | 102.1 | 69 | 68.1 |
| 488 | 447 | 454.9 | 225 | 227.5 | 152 | 151.6 | 114 | 113.7 | 76 | 75.8 |

As an example, the images of three of the focal spots (red, green and blue) of the diffractive lens B are all overlapping3. This was for the case when the diffractive lens B was shunted from a 12-level lens to a 4-level lens in order to produce the focal length of 133 mm (at the design wavelength of 555 nm) which is one-third of the design focal length of 400 mm (See, P. Valley, D. L. Mathine, M. R. Dodge, J. Schwiegerling, G. Peyman, and N, Peyghambarian, "Tunable-focus flat liquid-crystal diffractive lens," Opt. Lett. 35, 336-338 (2010)), The focus spots were all nearly round and sharp, with some background scattered light due to lowering of the diffraction efficiency especially at shorter focal lengths.

Figure 3:
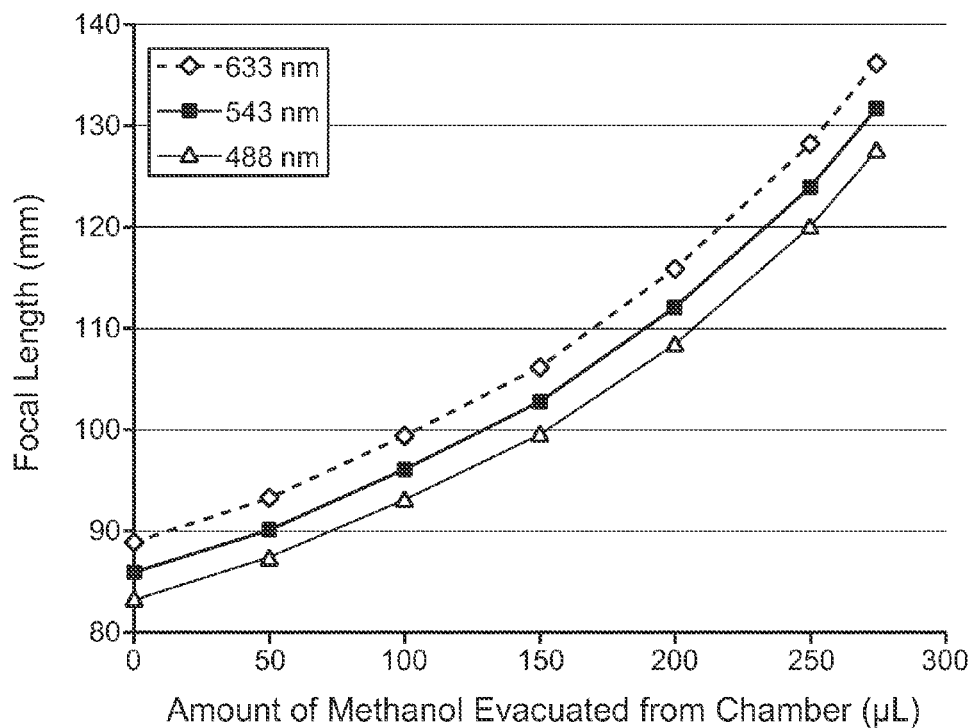
FIG. 3 is a graphical plot of chromatic dispersion of a variable focal piano-convex lens alone applying methanol at the three test wavelengths when set for 80 mm focal length and higher.

The fluidic lens illustrates a nonlinear response as fluid is withdrawn. As the membrane reaches higher radii, the membrane becomes flatter. The sensitivity to the amount of fluid increases within this range since a smaller amount of fluid varies the curvature. The measured values of the fluidic lenses focal length for the three wavelengths are depicted in FIG. 3 in terms of the amount of fluid injected in the lens.

The final step in producing the variable focal length achromat is the combination of the liquid crystal diffractive lens with the pressure controlled methanol fluidic lens. After adjusting the focal lengths of each lens to the appropriate values dictated by the achromat equation we measured the overall focal length of the hybrid lens at the red, green, and blue wavelengths. The experiment verified that the focus spots of the red and blue wavelengths coincided very closely. As the focal length is decreased, the spot size and aberrations are reduced as expected; however, the background scattered light is slightly increased. This is caused by the reduction in diffraction efficiency at the shorter focal lengths as the number of binary phase levels decreases due to the electrode shunting. See, P. Valley, D. L. Mathine, M. R. Dodge, J. Schwiegerling, G. Peyman, and N, Peyghambarian, "Tunable-focus flat liquid-crystal diffractive lens," Opt. Lett. 35, 336-338 (2010); P. Valley, M. R. Dodge, J. Schwiegerling, G. Peyman, and N. Peyghambarian, "Nonmechanical bifocal zoom telescope," Opt. Lett. 35, 2582-2584 (2010), The issue of low diffraction efficiency can be overcome by designing diffractive lenses with higher number of binary phase levels which results in smaller electrode sizes if the design optical power and aperture size are kept constant. This will require a more advanced micro-fabrication technique. On the other hand, the fluidic lens showed nearly round and sharp focus spots at short focal lengths when the curvature of the membrane was high, but at long focal lengths as the membrane became flatter considerable aberrations started to show up, of which astigmatism and coma were more pronounced.

Figure 5:
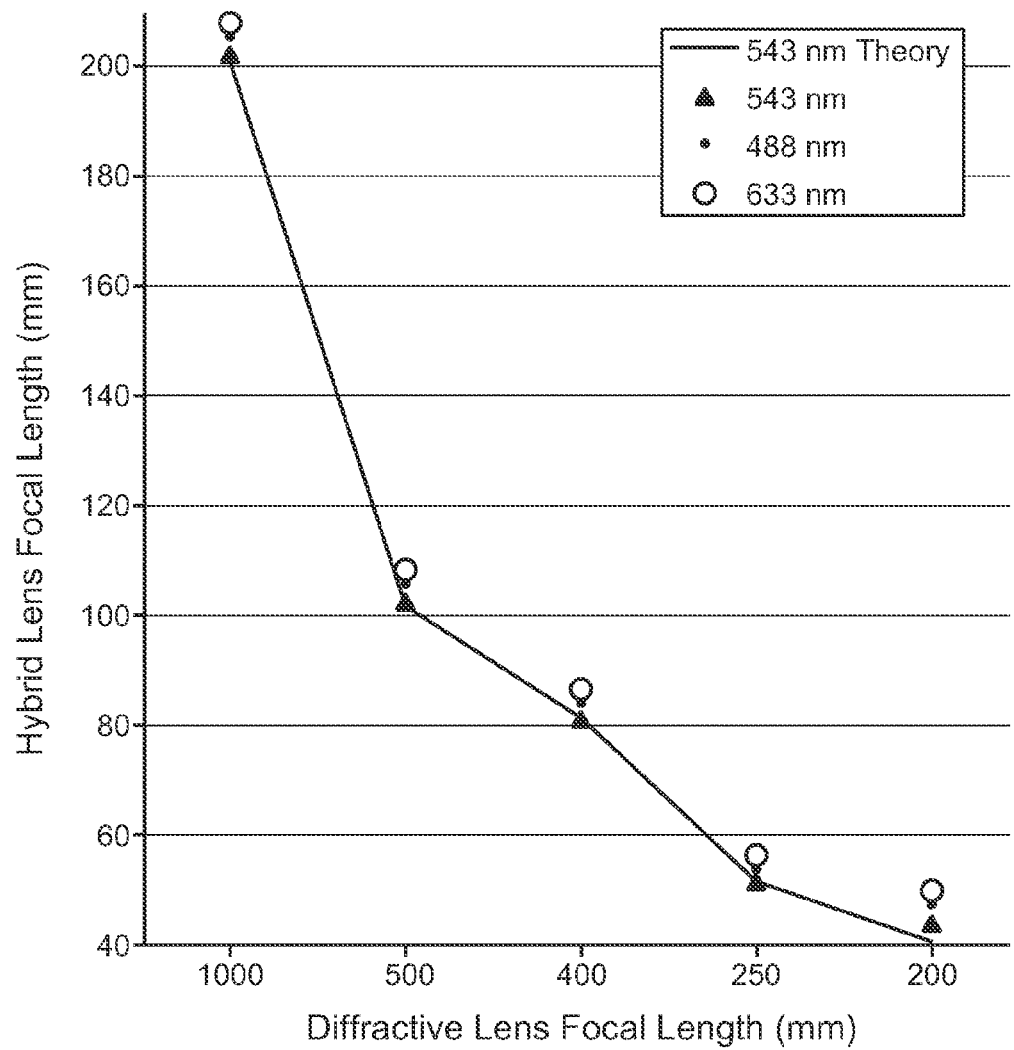
FIG. 5 is a graphical plot of the overall focal length of the hybrid system of FIG. 1 for the green, red and blue wavelengths focal lengths.

FIG. 5 shows the values of the overall focal length of the hybrid diffractive/fluidic lens for the green, blue and red test wavelengths. As expected, the green light comes to focus first and then the red and blue lights will come into focus near the same plane. The measured focal lengths of the hybrid lens closely matched with the expected focal length values seen from FIG. 5. Our hybrid diffractive/refractive lens has the advantage of being multi-focal and non-mechanical compared to the traditional lenses. The chromatic aberration was significantly reduced but not completely at this time corrected due to the current limitations which can be overcome by improving the fabrication. As shown in FIG. 5, the doublet 10 is substantially achromatic over a range of about 40 to 200 mm for red, green and blue wavelength ranges. However, with different fluids selected for the fluidic lens 14, the doublet may be substantially achromatic for red, green and blue wavelength ranges over a range of focal lengths in excess of 10 mm. This may be adequate for some applications.

The clear aperture of our liquid crystal diffractive lenses is limited by the photolithography capabilities, number of binary phase levels, and diffraction efficiency, whereas the fluidic lens is aperture limited by the pressure control of the mechanical flanges on the periphery. If the aperture becomes too large then we cannot produce an even distribution of pressure holding down the membrane, inducing uncontrollable aberrations. The function radius of curvature of the fluidic lens is limited by the tensile strength of the designed membrane. Using a broad-band positive photoresist (SI805) and Karl-Suss MA6 contact printer operating around i-line (365 nm), we were able to achieve one micron feature sizes. Employing more advanced fabrication tools smaller features can be made and the design aperture can be increased. This is due to the facts that the Fresnel zones get narrower as moving away from center and as the number of binary phase levels or the design optical power is increased. Diffraction efficiency can also become a limiting factor if the zone widths become comparable to the liquid crystal thickness or the inter-electrode gaps (in case of one-layer electrode design). See, P. Valley, D. L. Mathine, M. R. Dodge, J. Schwiegerling, G. Peyman, and N, Peyghambarian, "Tunable-focus flat liquid-crystal diffractive lens," Opt. Lett. 35, 336-338 (2010); P. Valley, M. R. Dodge, J. Schwiegerling, G. Peyman, and N. Peyghambarian, "Nonmechanical bifocal zoom telescope," Opt. Lett. 35, 2582-2584 (2010); B. Apter, U. Efron, and E. Bahat-Treidel "On the fringing field effects in liquid-crystal beam-steering devices," Appl. Opt. 43, 11-19 (2004).

Diffractive lens A has a maximum design aperture of 10 mm, 8 phase levels, 1 diopter minimum optical power, no inter-electrode gaps (odd and even electrodes interleaved into two layers), about 8-micron narrowest electrode, and about 7-micron thick liquid crystal. Diffractive lens B has a maximum design aperture of 6 mm, 12 phase levels, and 2.5 diopter minimum optical power with one micron inter-electrode gaps (one-layer electrode design), about 5-micron narrowest electrode, and about 4-micron thick liquid crystal. To increase the diffraction efficiency, liquid crystal thickness can further be decreased by using smaller glass fiber spacer beads during assembly. However, the minimum thickness in order to achieve at least $2\pi$ phase retardation using the E7 liquid crystal and any wavelength shorter than 633 nm would be $(\lambda \Delta\Phi_{max}/(2\pi\Delta n_{max}) = \lambda/\Delta n_{max} = 0.633/0.225 = 2.8$ micron.

Figure 6:
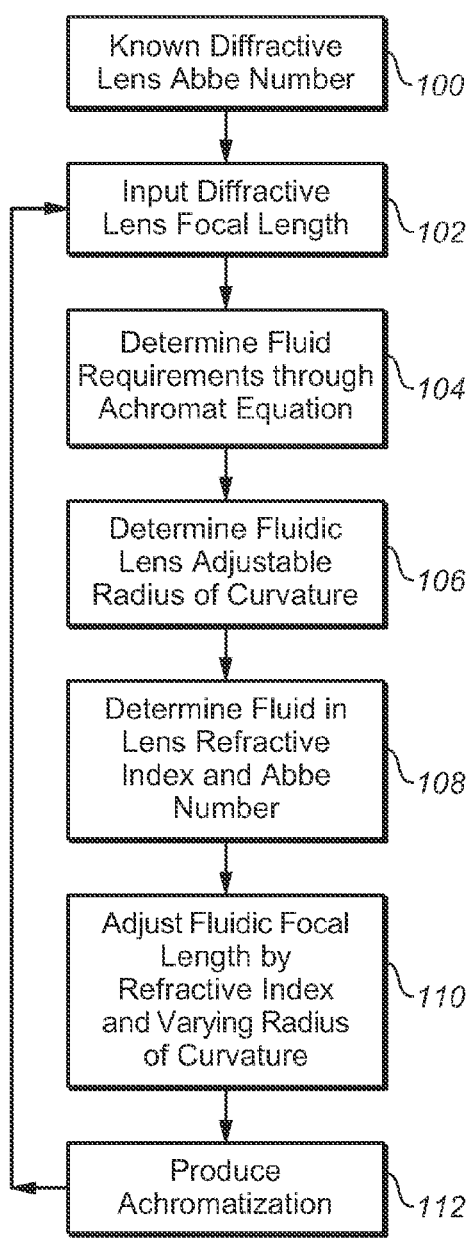
FIGS. 6 and 7 are flow charts illustrating a method for constructing the doublet 10 of FIG. 1.
Figure 7:
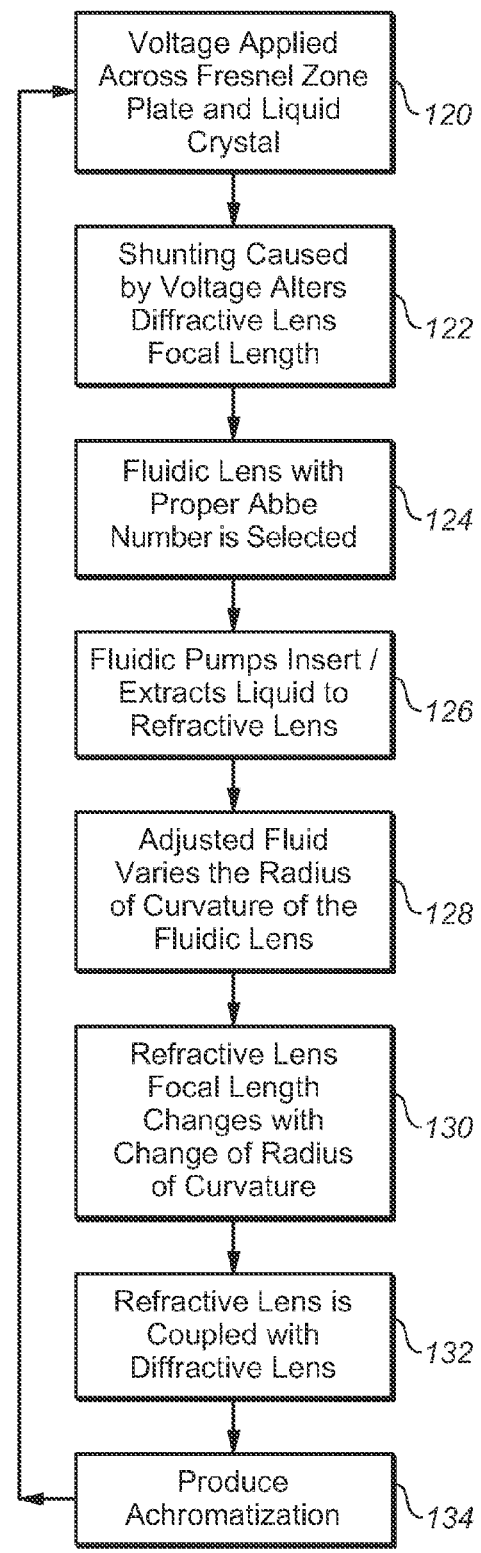

FIGS. 6 and 7 are flow charts illustrating a method for constructing the doublet 10 of FIG. 1. As shown in FIG. 6, from a known Abbe number of the diffractive lens 12 (block 100), a focal length of the diffractive lens is selected (block 102). Then one uses the achromat equation to determine the requirements for the fluidic lens 14 (block 104) to compensate for the primary chromatic aberration of the diffractive lens 12, such as by reference to table 1. The radius of curvature of the fluidic lens 14 is determined (block 106), and a fluid with the desirable Abbe number and refractive index is selected for the fluidic lens 14 (block 108). The focal length of the fluidic lens 14 may be adjusted by adjusting the radius of curvature (block 110). Achromatization may then be produced by combining the diffractive lens 12 and fluidic lens 14 (block 112).

The doublet 10 may then be constructed as follows as illustrated in FIG. 7. Appropriate voltages are applied to the subzones of the diffractive lens 12 and the liquid crystal to select a focal length of the diffractive lens 12 (block 120). Shunting of the subzones will alter the focal length of the diffractive lens 12 (block 122). A fluid with the desirable Abbe number is selected (block 124). A fluid pump then inserts or extracts the selected fluid to or from the fluidic lens 14 (block 126). The radius of curvature of the fluidic lens 14 is adjusted (block 128), where the focal length of the fluidic lens 14 will change with the radius of curvature (block 130) to compensate for the primary chromatic aberration of the diffractive lens 12. The fluidic lens 14 is then coupled to the diffractive lens 12 (block 132) to produce achromatization (block 134).

Instead of a doublet combining a diffractive lens 12 and a fluidic lens 14, it is also possible to replace the diffractive lens 12 with a second fluidic lens to accomplish a doublet that is achromatic for red and blue wavelengths over a range of different focal lengths. Such a second fluidic lens may be constructed in a manner similar to fluidic lens 14, and the same pump using a second syringe different from syringe 38 is used to inject or extract fluid from such second fluidic lens. Thus, the same pump under the control of a controller may be used to control both fluidic lenses.

CONCLUSION

In conclusion, we have demonstrated a variable focal length achromatic lens that consists of a variable liquid crystal diffractive lens and a variable pressure-controlled fluidic lens. We used two diffractive lenses that produce multiple discrete focal lengths with an Abbe number of −3.45. The fluidic lens can provide a more continuous variation, and its focal lengths are chosen such that they minimize the dispersion of the diffractive lens. We chose Methanol for the fluidic lens due to its high dispersion properties. Then we combined the fluidic lens and one diffractive lens at a time to minimize the dispersion between the red and blue wavelengths. The lenses showed acceptable optical properties and the test results were close to the theoretical predictions. This adjustable hybrid lens has no moving parts and would be useful for compact color imaging applications, and medical and ophthalmic imaging devices.

The materials and designs describe above represent a preferred embodiment. However, it is understood that the scope of the invention are not limited to these choices.

What is claimed is:

1. An optical system comprising:
   two lenses wherein a focal length of each of the two lenses is adjustable to alter a focal length of the system, so that the system is substantially achromatic over a range of values of focal length of the system, wherein the two lenses include a diffractive lens and a refractive lens; and
   at least one device for adjusting the focal length of each of the two lenses.

2. The system of claim 1, wherein the diffractive lens comprises a Fresnel zone plate having portions that form a pattern and a liquid crystal material, and the at least one device alters a refractive index of the liquid crystal material and electrically modifies subzones of the Fresnel zone plate and re-establishes phase wrapping points of the Fresnel zone plate in order to adjust the focal length of the diffractive lens.

3. The system of claim 2, wherein the at least one device comprises a power supply and an electrode adjacent to the liquid crystal material, so that when voltages are applied by the power supply to the pattern to shunt some of the portions of the Fresnel zone plate, the focal length of the diffractive lens is altered.

4. The system of claim 1, wherein the refractive lens includes a fluidic lens, the at least one device comprising means for controlling an amount of fluid in the fluidic lens to alter its focal length.

5. The system of claim 4, wherein the fluid in the fluidic lens has an Abbe number in a range from about 5 to 20.

6. The system of claim 5, wherein the fluid in the fluidic lens includes methanol.

7. The system of claim 1 wherein the fluid in the fluidic lens and the focal length of the fluidic lens are such that the fluidic lens compensates for the primary chromatic aberration of the diffractive lens.

8. The system of claim 1, wherein the system is substantially achromatic for red and blue light over a range of focal lengths in excess of 10 mm.

9. The system of claim 6, wherein the system is substantially achromatic for red and blue light over a range of focal lengths of the system from about 40 to about 200 mm.

10. A method for making an optical system comprising:
providing a diffractive lens which comprises a Fresnel zone plate having portions that form a pattern, a liquid crystal material and an electrode adjacent to the liquid crystal material;
applying voltages to the electrode and the portions of the Fresnel zone plate to select a focal length of the diffractive lens;
selecting a fluid with an Abbe number;
adjusting amount of said fluid in a fluidic lens to select a radius of curvature of the fluidic lens, wherein when the fluidic lens is placed adjacent to the diffractive lens, the fluidic lens compensates for the primary chromatic aberration of the diffractive lens over a range of focal lengths of the optical system in excess of 10 mm.

11. The method of claim 10, wherein the system is substantially achromatic for red and blue light over a range of focal lengths of the system from about 40 to about 200 mm.

* * * * *